United States Patent [19]
Perrin et al.

[11] 3,828,403
[45] Aug. 13, 1974

[54] PIPE COUPLING
[76] Inventors: Duane O. Perrin, 3205 Merrill Dr., Torrance, Calif. 90503; Julius G. Smegal, 10324 Banff St., Stanton, Calif. 80960
[22] Filed: Apr. 10, 1972
[21] Appl. No.: 242,575

[52] U.S. Cl.................. 24/270, 24/273, 285/365, 285/409
[51] Int. Cl...... F16l 21/00, F16l 23/00, B65d 63/00
[58] Field of Search.......... 285/365, 407, 408, 409, 285/410, 366, 367, 411, 373, 379; 24/270, 273, 249 LL, 249 WL; 16/128

[56] References Cited
UNITED STATES PATENTS

| 204,770 | 6/1878 | Smith.................. 285/373 |
| 733,995 | 7/1903 | Prohtlich et al.................. 285/373 |
| 2,417,741 | 3/1947 | Dillon.................. 285/367 |
| 2,590,744 | 3/1952 | Woodbury.................. 16/128 R |
| 2,913,262 | 11/1959 | De Cenzo et al.................. 285/373 |
| 2,936,186 | 5/1960 | Dunmire.................. 285/373 |
| 3,113,791 | 12/1963 | Frost et al.................. 24/270 |
| 3,201,156 | 8/1965 | Coats.................. 285/365 |
| 3,231,298 | 1/1966 | Tomb et al..................285/365 |
| 3,664,691 | 5/1972 | Nakamura.................. 285/373 |
| 3,705,737 | 12/1972 | Westerlund et al.................. 285/365 |

FOREIGN PATENTS OR APPLICATIONS

| 19,261 | 7/1907 | Great Britain.................. 16/128 R |
| 17,432 | 2/1912 | Great Britain.................. 285/365 |
| 226,809 | 4/1958 | Netherlands.................. 285/409 |
| 1,334,953 | 11/1961 | France.................. 285/365 |

*Primary Examiner*—Robert R. Mackey
*Assistant Examiner*—Alex Grosz
*Attorney, Agent, or Firm*—Lindenberg, Freilich, Wasserman, Rosen & Fernandez

[57] ABSTRACT

A clamp that can be rapidly operated to hold the ends of two pipes together so as to connect them, and which facilitates field repair when the clamp breaks. The clamp includes two indentical body members having hinge ends where they are hinged together and latch ends where they can be held together by a latch. The hinge end of each member has a pair of spaced hinge flanges, one located at one extreme side and the other located between the middle and other extreme side, to permit the pair of flanges on the two identical body members to be sandwiched into one another. A rubber seal is fastened to each body member, each seal extending slightly more than one-half circle, so that when the clamp is closed the ends of the seals on the two body members abut and compress against one another to form a tight seal. The latch end of each body member has a pair of laterally spaced strike flanges, and a latch lever passing between the strike flanges carries a latch member that clamps the strike ends together.

3 Claims, 8 Drawing Figures

PATENTED AUG 13 1974　　3,828,403
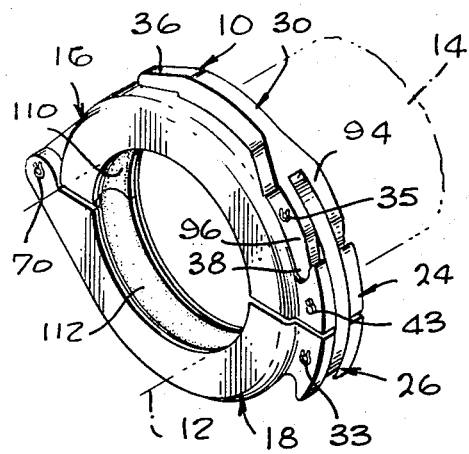
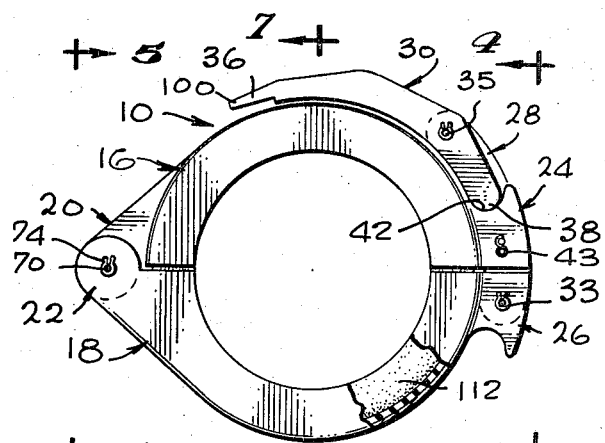
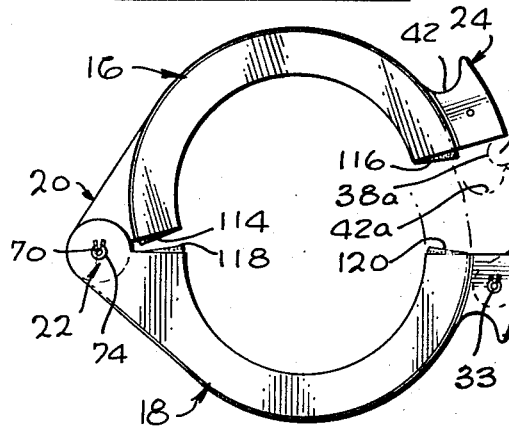
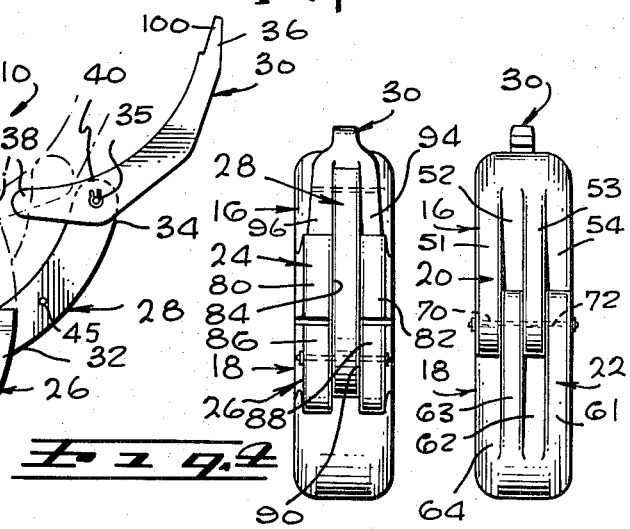
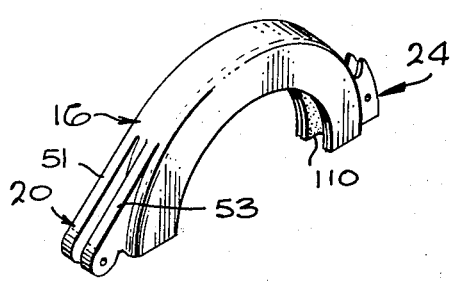
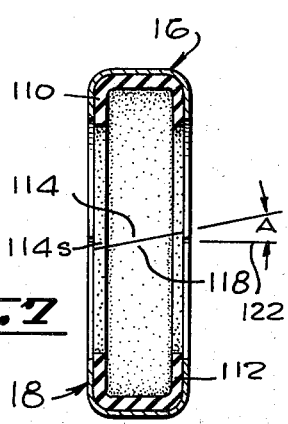
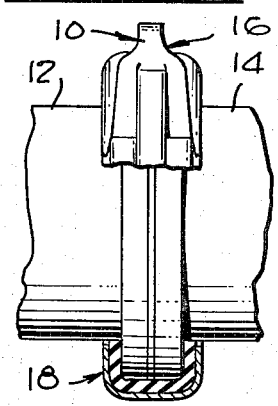

3,828,403

PIPE COUPLING

BACKGROUND OF THE INVENTION

This invention relates to pipe clamps and couplings.

One type of pipe coupling that is widely used in temporary installations includes a pair of body members that are hinged together at one end and which can be latched together at the other end, so that the coupling can be placed around a pair of abutting pipes and tightly closed on them to join them in a fluid-type seal. In certain hard-usage applications, such as in concrete pumping for building construction, there is a high instance of breakage of the couplings. Often, one of the body members will be subjected to rougher usage than the other parts and it will keep breaking. In clamps generally available heretofore, the entire clamp had to be discarded and a new one utilized. If the body members were identical, and if the coupling could be readily disassembled, then a workman could easily fix a coupling with a broken body member by replacing the body member with a spare or with the body member of another coupling that has broken. Of course, it is necessary that the coupling be simple so it can be sold at low cost, and that it be rugged to minimize the amount of breakage and to assure good clamping and sealing action during the life of the parts of the coupling.

SUMMARY OF THE INVENTION

In accordance with one embodiment of the present invention, a pipe coupling is provided which utilizes identical body members that can be replaced when broken, and which can be rapidly installed over the ends of pipes to connect them in a fluid-tight seal. The coupling includes a pair of substantially identical body members which are hinged at one end and which can be latched together at an opposite strike end. The hinge end of each member has a pair of laterally spaced hinge flanges, with the space between them offset from the center of the hinge end. This allows the flanges of the hinge ends to be snadwiched into one another and connected by a pin that extends through holes of the flanges. The strike end of each member has a pair of laterally spaced strike flanges, and a latch lever lies in the spaces between the strike flanges when the coupling is closed. Each coupling carries a rubber-like seal that extends slightly more than one-half of a circle, so that when the body members are closed on one another the ends of the seals abut one another and form a fluid-tight seal.

The novel features of the invention are set forth with particularity in the appended claims. The invention will best be understood from the following description when read in conjunction with the accompanying drawings.

BRIEF DESCRIPTION OF THE DRAWINGS

FIG. 1 is a perspective view of the pipe coupling of the present invention, shown in a closed configuration;

FIG. 2 is a front elevation view of the coupling of FIG. 1, showing it partially open;

FIG. 3 is a front elevation view of the clamp of FIG. 1, showing it closed;

FIG. 4 is a view taken on a line 4—4 of FIG. 3;

FIG. 5 is a view taken on a line 5—5 of FIG. 3;

FIG. 6 is a perspective view of one body member of the coupling of FIG. 1;

FIG. 7 is a sectional view taken on the line 7—7 of FIG. 3; and

FIG. 8 is a sectional view similar to FIG. 7, but showing the clamp installed on the ends of pipes.

DESCRIPTION OF THE PREFERRED EMBODIMENTS

The figures illustrate the pipe coupling 10 of the invention which can be used to hold a pair of pipes 12, 14 together. The coupling includes two body members 16, 18 which each extend in an arc of nearly a half circle between their opposite ends. The body members 16, 18 are identical, and each has a hinge end 20, 22 and a latch or strike end 24, 26. The body members are pivotally joined at their hinge ends so they can be opened wide to fit over the ends of a pair of pipes and then closed on the pipes.

As best shown in FIG. 2, the strike ends 24, 26 can be clamped together over the ends of the pipes by a mechanism which includes a latch lever 28 and latch member 30. The lever 28 has one end 32 pivotally mounted by a pin 33 on the strike end 26 of one body member and has an opposite end 34 which is pivotally connected by a pin 35 to the latch member 30. The latch member 30 has a handle end 36 and an opposite hook or latch end 38, and also has a middle portion 40 between the ends where it is connected to the lever 28. After the two body members 16, 18 have been closed over the pipe ends, a workman can clamp the body members together by pivoting the lever 28 until the latch end 38 of the latch member is in the position 38a, wherein the hook-shaped latch end begins to enter a recess 42a in the strike end 24. The latch member 30 then can be pivoted so its latch end 38 enters the recess 42a and much of its handle end 36 lies against the body member 16.

During such pivoting of the latch member 30, the latch end 38 forces the body members 16, 18 tightly towards each other. After the latch member 30 has been moved to its fully closed position as shown in FIG. 3, it tends to remain in this position until a workman forceably lifts up the handle end 36 of the latch member. A locking pin 43 can be projected through holes in the latch end 24 and through a hole 45 in the latch lever to prevent accidental opening of the coupling.

The coupling is useful in a variety of applications, including concrete pumping wherein it holds together pipes through which concrete is pumped at a construction site. In many of these applications, the coupling is subjected to very hard usage and there is a high frequency of breakage. Sometimes, only one portion of the coupling, such as one of the body members, breaks much more often than other parts. The cost of repairing broken couplings is reduced by making the body members 16, 18 identical. This allows salvaging of broken couplings even where the same part of the couplings keep breaking, and also minimizes the stock of spare parts that must be kept on hand. Furthermore, such a construction reduces the cost of manufacture and warehousing, by reducing the number of different parts.

As shown in FIG. 5, the hinge end 20 of the body member 16 defines four flange positions 51, 52, 53 and 54 progressively spaced from one side to the other of the hinge end 20. The body member 16 has hinge flanges 51, 53 at these flange positions and has flange-receiving spaces at the other flange positions 52, 54. The hinge end 22 of the other body member 18 is identically constructed, and it has hinges 61 and 63 that are received in the spaces 54, 52 of the other hinge end 20 and has spaces 62, 64 for receiving the flanges 53, 51 of the other hinge end. The two hinge ends 20, 22 are pivotally joined by a pin 70 that extends through hinge holes 72 formed in each of the hinge flanges 51, 53, 61, 63. Snap ring retainers 74 received in grooves at the ends of the pin 70 hold the pins in place. The same size pin with snap rings can be used at 33 and 35 to hold the latch lever 28 to a body member and to the latch member.

The construction of the hinge end 20, 22 of each body member, with a pair of laterally spaced hinge flanges that are offset from the center of the hinge end, enables a pair of identical hinge ends to be securely joined by a simple pin. In the joint, one flange 53 or 63 on each body member is sandwiched between a pair of hinge flanges on the other body member, so that primarily shear forces are applied to the pin and flanges. This makes the hinge joint strong and keeps it working smoothly under rough handling, and this is provided in a construction wherein the hinge portions of the two body members are identical.

As shown in FIG. 4, the latch end 24 of the body member 16 has two laterally spaced strike flanges 80, 82 located on opposite sides of the strike end 24 so there is a space 84 between them. The strike end 26 on the other body member 18 also has a pair of laterally spaced strike flanges 86, 88 that form a space 90 between them. The latch lever 28 extends through the spaces 84, 90. The lever 28 is closely received in the spaces 84, 90, so that it helps to assure that the strike ends of the two body members will not be far out of alignment when they are clamped to one another. The inner end 32 of the latch lever 28 is held by a pin 33 that extends through a hole in the lever and through aligned holes in the strike flanges 86, 88.

As shown in FIG. 1, the latch end 38 at latch member 30 is bifurcated, and forms two latching arms 94, 96. Each of these arms 94, 96 is received in a corresponding recess 42 of each of the strike flanges 80, 82. Thus, the latch member 30 presses against two laterally spaced flanges 80, 82 of the strike end, so that the closing forces on the coupling are evenly distributed. The space between the two arms 94, 96 of the bifurcated latch member receives the outer end 34 of the latch lever 28. The lever 28 therefore can closely control the position of the latch member 30 and can securely connect to it. A pin 35 connects the latch member 30 to the latch lever 28.

The handle end 36 of the latch member 30 extends in a curve so that it can lie close to the body member 16. However, its extreme end portion 100 extends substantially straight and has a width approximately equal to its depth (e.g., like a circle or square). This facilitates close reception of end portion 100 in a small diameter pipe. The couplings are sometimes difficult to open by merely grasping the handle end of the latch member and pulling it open. Greater leverage can be obtained by a workman, by inserting the end of a small diameter pipe over the extreme end portion 100 of the handle and using the pipe as a handle extension in opening it. Such small diameter pipes are readily found around building sites, or a workman can keep a length of the pipe handy for such use.

The pipe coupling not only is generally required to hold two pipes together, but also to form a substantially fluid-tight seal that minimizes the leakage of material that is flowing through the pipe line. Continuous ring-shaped seals can form a good seal, but they sometimes are not convenient to use in the rapidly installable coupling. Instead, a pair of seal members 110, 112 is provided, each of which extends in an arc of approximately ½ circle along the inside of each body member 116 or 118. Each seal member is constructed of a rubber-like material in order that it may readily deform to provide a good seal. Each seal member is held by adhesive or the like to the inner or pipe-facing region of its respective body member, although it can be mounted by merely laying it in place.

When the body members 16, 18 are tightly closed on one another over the ends of two pipes, they press the middle portions of each seal member 110, 112 hard against the pipe to form a good seal. However, the ends of the seal members are not pressed hard against the pipe. Even if the ends of the seals abutted one another, excessive amounts of fluid within the pipe line might still leak between the ends of the seal members. To minimize such leakage, each seal member 110, 112 is constructed so that it extends in an arc of slightly more than ½ circle, that is, it extends in a greater arc than the insides of the body members 16, 18. As a result, each end 114, 116 of one seal member 110 presses hard against a corresponding end 118, 120 of the other seal member 112 as the body members 16, 18 are tightly clamped together. This end pressure of the seal members against each other tightly closes any gap and results in a minimum leakage of fluid through the seal. In order to closely locate the ends of the seals, each of the ends is formed at an angle A of at least a few degrees (see FIG. 7) with the axial direction 122, that is, with an imaginary line 122 extending parallel to the axis about which the seal members are curved. As a result, one side such as 114s of a seal member end 114 projects past the corresponding end 20 of the body member 16 on which the seal member is mounted, and into the other body member 18.

Thus, the invention provides a pipe coupling with identical body members, which can be rapidly installed over a pair of pipe ends to securely connect them in a substantially fluid-tight connection, and which can be easily removed from the pipes. The coupling is constructed so that it is rugged and its parts are securely held together to maximize its life. However, any part that breaks can be rapidly replaced in the field, with a minimum of spare parts being required and with the body member of any broken coupling being usable in replacing either body member of another coupling. The coupling also permits field alteration, to connect the latch lever 28 to either body member 16 or 18, so that the handle 36 is in the most convenient location. It should be noted that it is not necessary that both body members 16, 18 be exactly identical to permit interchanging, but only that they are substantially identical, in an amount that permits functioning in either body member position. Of course, some of the advantages of the coupling construction, such as the abutting seal members and the latch lever that aligns the body members, can be obtained even if the body members are not interchangeable.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A pipe coupling comprising:

a pair of substantially identical and mutually interchangeable body members, each member having hinge and strike ends and extending in an arc of a half circle between said ends, said members being pivotally joined at their hinge ends, each member having a pair of strike flanges on either side of its strike end and said strike flanges being spaced to leave a central gap between them;

a latch lever having a first end disposed between and pivotally connected to the pair of strike flanges on a first of said body members, and having a second end; and a latch member having a bifurcated first end portion with a pair of laterally spaced parts engageable with a pair of said strike flanges, said second end of said lever disposed between and pivotally connected to said laterally spaced parts of said first end portion of said latch member, and said latch member having a second end portion forming a handle.

2. The pipe coupling described in claim 1 wherein:

each pair of strike flanges has aligned pin-receiving holes, and said latch lever has a first hole at said first end for receiving a pin (33) that projects through the pin-receiving holes of the pair of strike flanges on which the first latch lever end is pivotally mounted, and said latch lever has a second hole located so it is aligned with the pin-receiving holes of the other strike flanges when the latch lever is in a closed position, to permit the reception of a locking pin (43) that holds the latch lever in the closed position.

3. A pipe coupling comprising:

a pair of identical body members (16, 18), each member having hinge and strike ends and extending in an arc of a half circle between said ends, the hinge end (20) of each member including a pair of laterally spaced hinge flanges (52, 54), one flange (54) located at one side of the hinge end and the other (52) located between the other side and the middle of the hinge end, and the hinge flanges of the two body members being sandwiched together and having holes for receiving a pivot pin;

the strike end (24) of each body member having a pair of strike flanges (80, 82) on either side of its strike end that leave a central gap between the strike flanges, the pair of strike flanges of each body member having a pair of aligned pin-receiving holes and each strike flange having a latch receiving recess (42);

a latch lever (28) having a first end (32) disposeable between the pair of strike flanges on one of said body members and having a pin-receiving hole for pivotal connection thereto, and having a second end (34); and a latch member (30) having a bifurcated first end portion (38) with a pair of laterally spaced parts engageable in the recesses (42) of a pair of said strike flanges, said second end (34) of said lever disposeable between and pivotally connectable to said laterally spaced parts (94, 96) of said first end portion, and said latch member having a second end portion (36) forming a handle.

* * * * *